United States Patent

Yoshida et al.

[11] Patent Number: 5,109,821
[45] Date of Patent: May 5, 1992

[54] ENGINE CONTROL SYSTEM

[75] Inventors: Masato Yoshida, Kyoto; Takanao Yokoyama, Nagaokakyo; Muneyoshi Nanba, Kyoto; Yoshihiko Kato, Kyoto; Kazumasa Iida, Kyoto; Katsuhiko Miyamoto, Kyoto, all of Japan

[73] Assignee: Mitsubishi Jidosha Kogyo Kabushiki Kaisha, Tokyo, Japan

[21] Appl. No.: 642,511

[22] Filed: Jan. 17, 1991

[30] Foreign Application Priority Data

Jan. 19, 1990 [JP] Japan .................. 2-11519
Feb. 2, 1990 [JP] Japan .................. 2-23759

[51] Int. Cl.$^5$ .............................. F02D 5/14
[52] U.S. Cl. .................. 123/425; 123/479
[58] Field of Search .......... 123/425, 435, 479

[56] References Cited

U.S. PATENT DOCUMENTS

| | | | |
|---|---|---|---|
| 4,905,649 | 3/1990 | Washino et al. | 123/435 |
| 4,957,087 | 9/1990 | Ota | 123/479 |
| 4,989,570 | 2/1991 | Kuri | 123/479 |
| 4,993,388 | 2/1991 | Mitsumoto | 123/435 |
| 5,014,670 | 5/1991 | Mitsumoto | 123/479 |

FOREIGN PATENT DOCUMENTS 1-13558 5/1989 Japan ............... 123/435

Primary Examiner—Tony M. Argenbright
Assistant Examiner—Robert E. Mates
Attorney, Agent, or Firm—Abelman Frayne & Schwab

[57] ABSTRACT

In an engine using fuel mixture of gasoline and methanol, the present control system compensates a detection value of a blend ratio sensor with a detection value of a knock sensor, or causes trouble detecting means to detect a failure of the blend ratio sensor and memories the blend ratio immediately before the failure as an assumed blend ratio and compensates the stored value with the detection value of the knock sensor, whereby the engine control is executed based on the control blend ratio and the ignition timing acquired through the compensation.

9 Claims, 9 Drawing Sheets

ENGINE CONTROL SYSTEM

BACKGROUND OF THE INVENTION

1. Field of the Invention

The present invention relates to an engine control method for controlling the operation of an engine using fuel mixture.

2. Description of the Related Art

Recently attention has been paid to methanol as low-pollution fuel, and a methanol engine has been developed accordingly. It is however almost impossible to replace gasoline with methanol as fuel for every car. It is expected that both the methanol fuel and the gasoline are used at least temporarily at the time of such replacement takes place.

To cope with such a situation, it is proposed to introduce a Flexible Fuel Vehicle (hereafter referred to as "FFV") which can use either the gasoline fuel or the methanol. That is, the FFV has more freedom in using fuel.

To take an accurate timing of igniting an engine and precisely control the amount of fuel injection, the FFV detects a blend ratio or mixing ratio of the gasoline to methanol, and will control individual sections of the engine. Blend ratio detecting means in this case is a blend ratio sensor which is installed directly in the fuel supply system and directly detects a blend ratio. This sensor has been studied and improved, and nowadays is used.

The octane number of the fuel mixture varies depending on the blend ratio. This particularly requires adjustment of the ignition timing according to the blend ratio, and its compensation process is performed.

If the blend ratio sensor is damaged or fails, or if both the blend ratio sensor and a knock sensor fail when the blend ratio is estimated on the basis of the output of the knock sensor, the control blend ratio would greatly deviate from the real ratio.

The engine control under the improper ignition timing will cause the engine to improperly function. The control range of the ignition timing of the FFV engine is set large compared to that of the ordinary gasoline engine. Therefore, igniting the engine at the incorrect time may damage the engine, which raises a problem.

The present invention aims to provide a method for acquiring the proper control blend ratio and ignition timing even when the blend ratio sensor and knock sensor fail, thereby performing satisfactory operation control of the engine.

SUMMARY OF THE INVENTION

Accordingly, it is an object of the present invention to provide a method which can ensure smooth operational control of an engine using the fuel mixture of gasoline and methanol, even when a blend ratio sensor or the like outputs incorrect detection data.

According to one aspect of the present invention, there is provided an engine control method comprising:

a blend ratio sensor, arranged in a fuel supply pipe to supply fuel to an engine, for detecting a blend ratio of methanol;

a knock sensor for outputting knock data of the engine;

a calculating means for computing fuel blended ratio based on the knock data;

compensation means for compensating a signal from the blend ratio sensor with an output signal from the calculating means, and for acquiring a control blend ratio; and control means for controlling the engine based on an output signal from the compensation means.

According to another aspect of the present invention, there is provided an engine control method comprising:

a blend ratio sensor, arranged in a fuel supply pipe to supply fuel to an engine, for detecting a blend ratio of methanol;

a knock sensor for outputting knock data of the engine;

a calculating means for computing fuel blended ratio based on the knock data;

compensation means for compensating a signal from the blend ratio sensor with an output signal from the calculating means, and for acquiring a control blend ratio;

trouble detecting means for detecting failure of the blend ratio sensor;

memory means for memorizing a blend ratio right before failure of the blended ratio sensor, as an assumed blend ratio when the blend ratio sensor fails; and control means for controlling the engine in accordance with the assumed blend ratio and a signal from the compensation means.

According to the present invention, the engine can be properly controlled in the normal operation, based on the blend ratio acquired in accordance with the outputs of the blend ratio sensor and knock sensor, while, at the failure of the blend ratio sensor, or the like, compensation of the control blend ratio and the ignition timing enables engine control without causing knocking or the like.

BRIEF DESCRIPTION OF THE DRAWINGS

FIGS. 1 to 6 are diagrams for the first embodiment of the present invention.

FIG. 1 is a control block diagram;

FIG. 2 is a graphic view for explaining a knock learn range;

FIG. 4 is a schematic diagram illustrating the structure of an engine controller; and FIGS. 5 and 6 are flowcharts illustrating a control program used in a engine control process.

FIG. 7 is a control block diagram; and

FIGS. 8 to 10 are flowcharts showing a control program used in an engine control process.

DETAILED DESCRIPTION OF THE PREFERRED EMBODIMENTS

Figure 1:
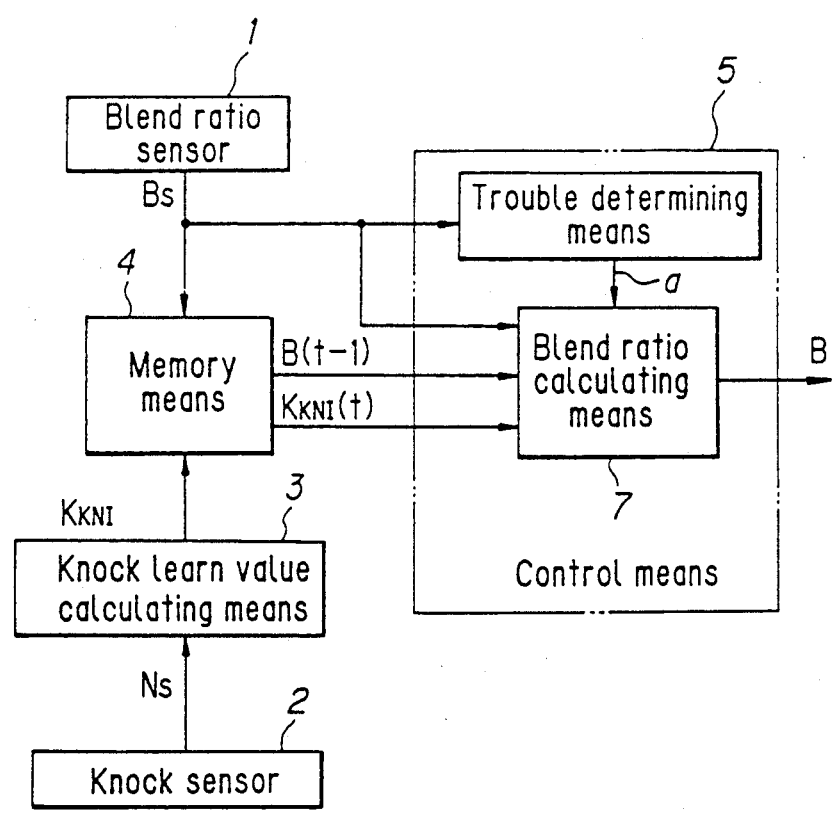

Two preferred embodiments of this invention will now be described referring to the accompanying drawings. Sections such as control hardware common in both embodiments will be described only in the description of the first embodiment to avoid redundancy.

According to the first embodiment, in the normal operation of the blended sensor, its output or the blend ratio is regarded as a control blend ratio. At the failure of the blended sensor, an assumed blend ratio and a knock learn value are obtained from a memory means, the assumed blend ratio is compensated in accordance with the knock learn value so as to compute the control blend ratio. According to the second embodiment, the correct ignition timing is normally obtained based on the blend ratio acquired in accordance with the outputs of the blend ratio sensor and the knock sensor. When both sensors are out of order, however, the ignition control can be done at such an ignition timing that the engine will not adversely be influenced.

First Embodiment

This method includes a blend ratio sensor 1 to output a blend ratio $B_S$ of fuel mixture of gasoline and methanol, a knock sensor 2 to output knock data $N_S$ of an internal combustion engine, knock learn value calculating means 3 to calculate a knock learn value (adaptive correction factor) $K_{KNI}$ according to the knock data $N_S$, memory means 4 to sequentially store the blend ratio $B_S$ and the knock learn value $K_{KNI}$, and control means 5 to compute a control blend ratio based on the blend ratio $B_S$ and the knock learn value $K_{KNI}$ and to output the control blend ratio.

The blend ratio sensor 1 is of a well-known type which detects data of a refractive index which varies according to the fuel blend ratio by means of an optical system, and photoelectrically converts the change in the amount of light and outputs it.

The knock sensor 2 includes a weight to press piezoelectric elements according to the engine vibration, and generates a voltage according to the vibration as the knock data $N_S$.

Figure 2:
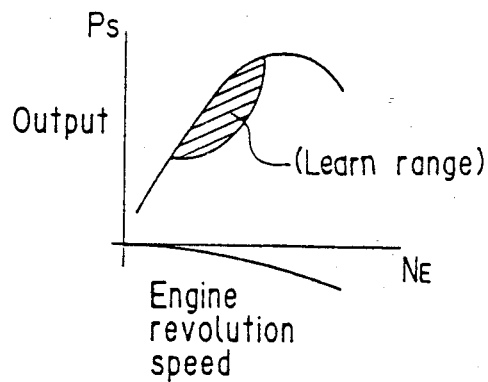

The knock learn value calculating means 3 learns when the engine operation range is within a set learn range (a shaded area shown in FIG. 2; a high load range of high frequency of knock occurrence is selected as such). The frequency of knock occurrence is obtained for each renewal cycle of a predetermined learn value. If this frequency exceeds a specific value, a specific value $+G_K$ is added to the previous knock learn value $K_{KNI}(t-1)$. If the frequency is below the specific value, the value $+G_K$ is subtracted from the previous learn value $K_{KNI}(t-1)$, thereby renewing the present learn value $K_{KNI}$.

The memory means 4 has an area for storing the blend ratio $B_S$ and the knock learn value $K_{KNI}$.

Trouble determining means 6 of the control means 5 obtains the blend ratio $B_S$, and determines if the blend ratio sensor 1 is failing based on the obtained value and the previous value of the blend ratio, and outputs a failure signal a. Further, while the blend ratio calculating means 7 is not receiving the failure signal a from the trouble determining means 6, it selects the blend ratio $B_S$ from the blend ratio sensor as a control blend ratio B, and outputs the ratio B.

On the other hand, while receiving the signal a, the calculating means 7 obtains a blend ratio $B_S(t-1)$ right before the failure from the memory means 4 in place of the output from the blend ratio sensor, and compensates the obtained value according to the knock learn value $K_{KNI}$, and outputs it as the control blend ratio B. When the knock learn value $K_{KNI}$ is equal to or larger than the specific value, i.e., when knock frequently occurs, the blend ratio $B_S(t-1)$ right before the failure is reduced by a specific amount to decrease the frequency of occurrence of the knocking. When the knock learn value $K_{KNI}$ is equal to or smaller than the specific value, i.e., when no knock occurs, the blend ratio $B_S(t-1)$ is increased by a specific amount to compensate the knock learn value to the frequent knocking side.

An engine controller of an FFV to which the method detecting of the fuel blend ratio according to the present invention is applied will now be explained referring to FIG. 4.

A combustion chamber 11 of an engine 10 properly communicates with an air inlet passage 12 and an air outlet passage 13. The air inlet passage 12 is formed by an air cleaner 14, a first air intake duct 15, a surge chamber 16, and a second air intake duct 17. The air outlet passage 13 is formed by a first outlet duct 18, a catalyst 19, a second outlet duct 20 and a muffler 21.

An air flow sensor 22 for outputting data of the amount of passing air, an air pressure sensor 23 for outputting air pressure data and an air temperature sensor 24 for outputting air temperature data are provided in the air cleaner 14; these sensors are connected to an engine control unit (hereinafter referred simply as controller) 25.

In the surge chamber 16 are disposed a throttle valve 26 and a throttle position sensor 27 associated therewith. This throttle valve 26 is so designed that its idle position is controlled by the controller 25 via an idle speed control motor (ISC motor) 28.

A water jacket is disposed facing part of the second air intake duct, with a temperature sensor 29 attached to the water jacket.

An $O_2$ sensor 30, which outputs data of the oxygen density in the exhaust, is mounted in a midway of the first outlet duct 18.

Further, a fuel injection valve 31 is attached to the end portion of the air inlet passage 12. This valve 31 is connected through a branch pipe to a fuel pipe 33. This fuel pipe 33 connects a fuel pump 34 to a fuel tank 35, and a blend ratio sensor 43 is attached to a midway point of the fuel pipe 33. The blend ratio sensor 43 is of a well know type, which detects data of the fuel blend ratio which changes according to a refractive index by means of an optical system, photoelectrically converts the change in the amount of light to an electric signal and outputs the signal to the controller 25. A fuel pressure regulator 36 is designed to control the fuel pressure in accordance with the boost pressure.

An ignition plug 46 is attached in the combustion chamber 11 of the engine 10, and is connected to an ignition circuit 45 which comprises a power transistor (not shown) and an ignition coil driven by the transistor. This ignition circuit 45 is connected to an ignition driver 44 to be described later. Further, a knock sensor 47 is installed in the vicinity of the combustion chamber 11 of the engine, and its knock data $N_S$ is output to the controller 25. The knock sensor 47 has a weight to press piezoelectric elements according to the engine vibration and generates a voltage having a level according to the vibration as the knock data $N_S$.

Figure 4:
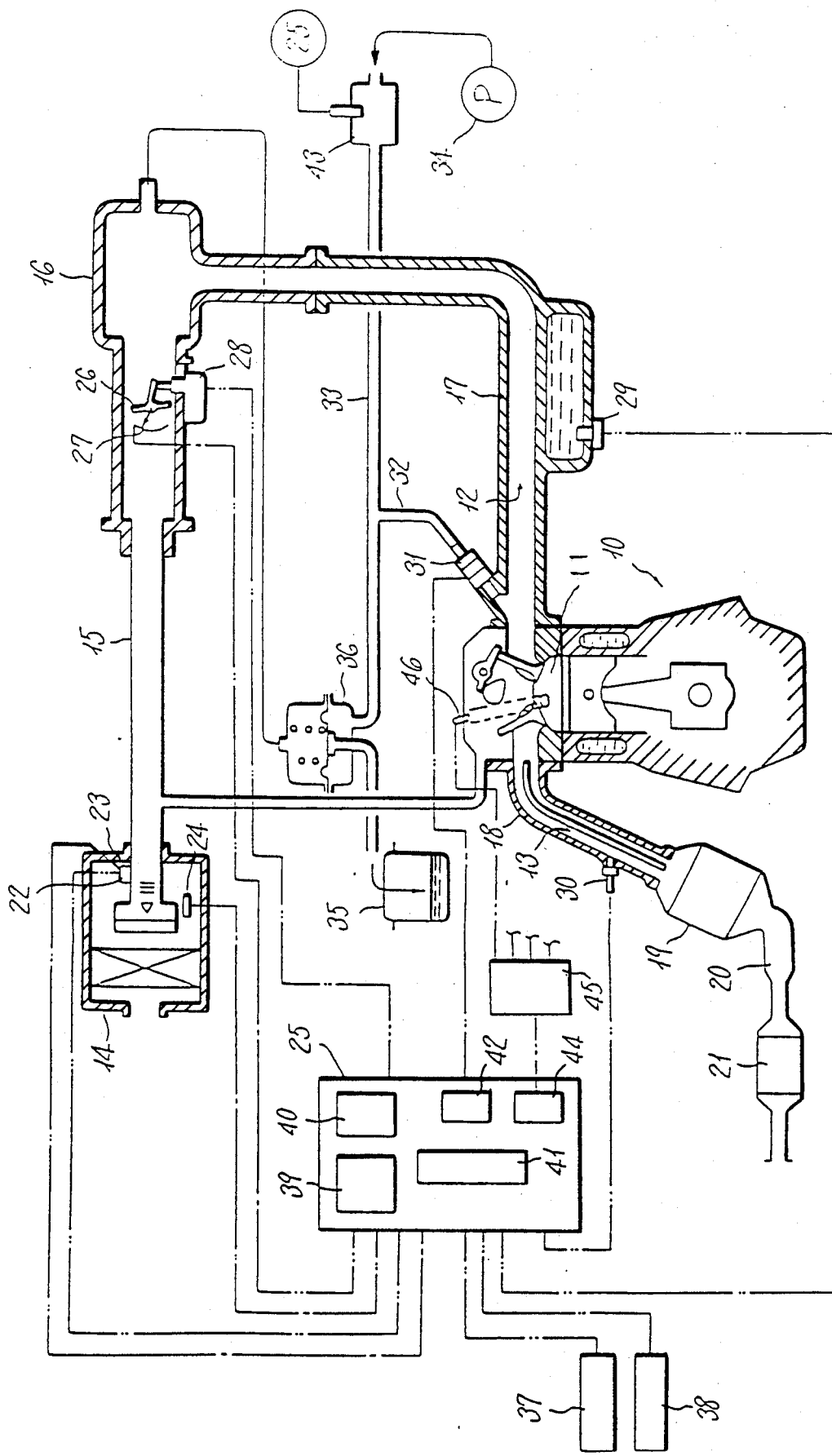

In FIG. 4, reference numeral 37 denotes a crank angle sensor which outputs crank angle data (unit crank angle data), and reference numeral 38 denotes a top dead center sensor which outputs top dead center data of the first cylinder (reference crank angle data).

The controller 25 includes a control circuit 39, a memory circuit 40, an input/output (I/O) circuit 41 and drives 42 and 44.

The control circuit 39 receives input signals from the individual sensors, performs the necessary process according to a predetermined control program, and outputs a control signal.

Figure 5:
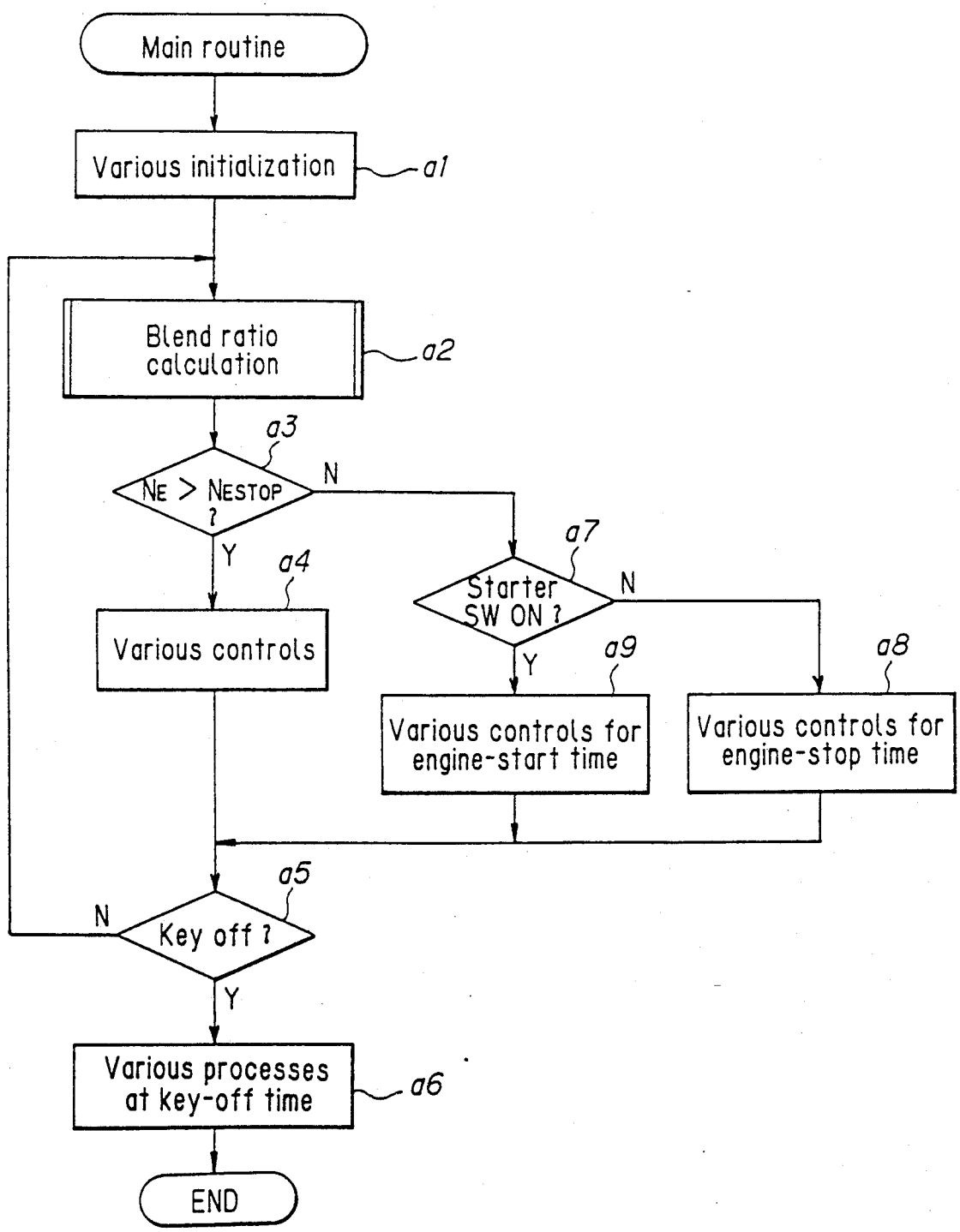
Figure 6:
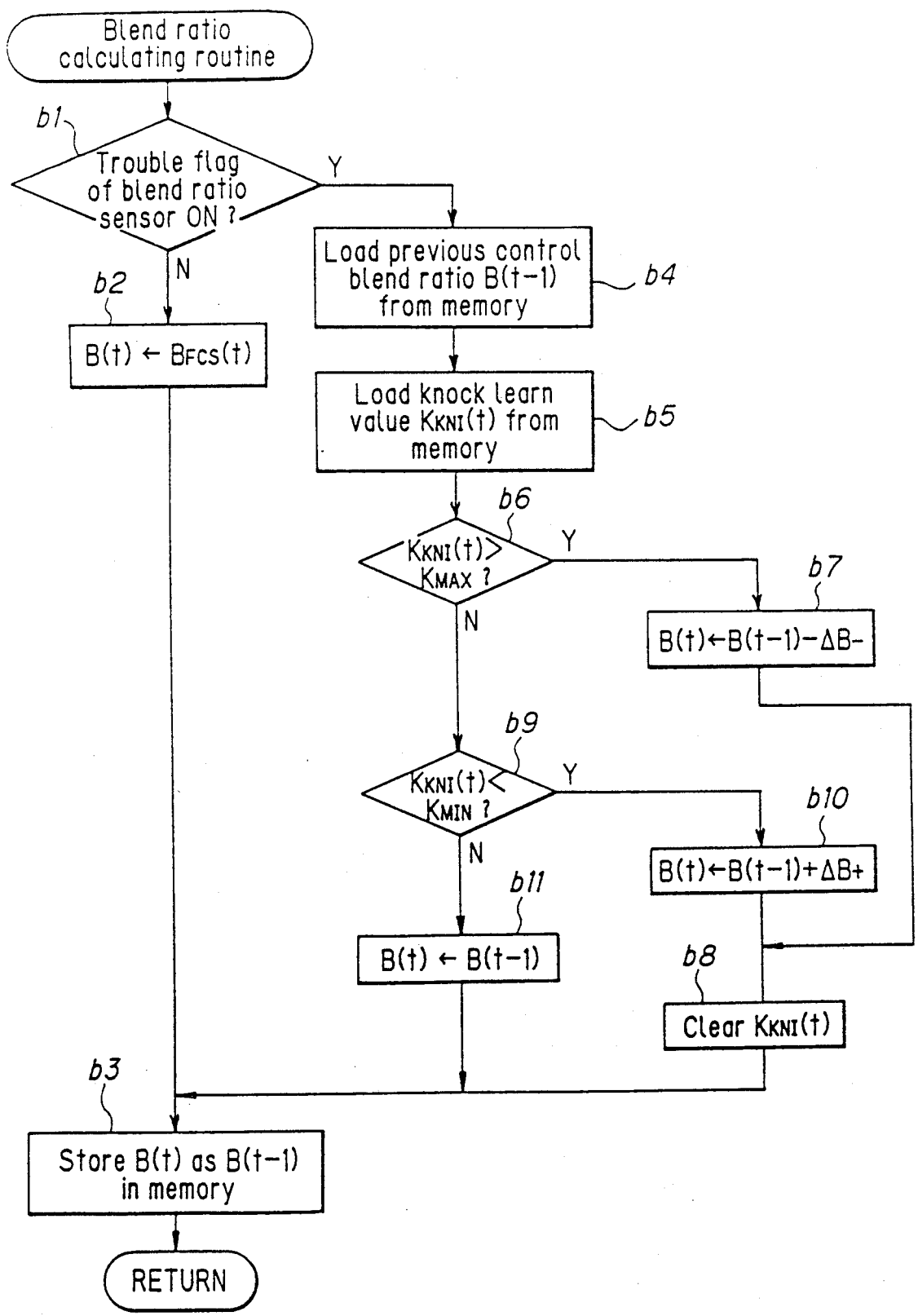

The memory circuit 40 has various control programs, such as a known main routine for engine control as shown in FIG. 5, a blend ratio calculating routine shown in FIG. 6, an ignition timing calculating routine (not shown) and a fuel injection routine (not shown), stored therein, and also has control value calculation maps stored therein. The memory circuit 40 further has an area for holding compensation coefficients and calculated data for use in control, and other values as well.

The I/O circuit 41 obtains the output signals of the aforementioned individual sensors when needed, outputs a valve drive signal through the valve driver 42 to open the fuel injection valve 31 at a given time or outputs an ignition signal through the driver 44 to the ignition circuit 45, and outputs other control signals through a driver (not shown).

The operation of the controller 25 will now be explained referring to the control programs shown in FIGS. 5 and 6.

Turning on a key switch (not shown) of the engine drives the controller and the individual sensors. First, the controller 25 sets initial values to individual set values, measuring values, etc., and enters a blend ratio calculating routine in step a2.

In the blend ratio calculating routine, it is discriminated in step b1 whether or not the trouble flag of the blend ratio sensor 43 is ON. If the flag is OFF, the flow advances to step b2 where the present blend ratio $B_{FCS}$ as a control blend ratio B(t). This control blend ratio B(t) is stored as the previous control blend ratio B(t−1) in a memory in step b3, then the flow returns to the main routine.

When the blend ratio sensor 43 is discriminated as failing in step b1, the flow advances to step b4 where the previous control blend ratio B(t−1) is loaded from the memory. Then, a knock learn value $K_{KNI}(t)$ is loaded from the memory in step b5.

Figure 3A:
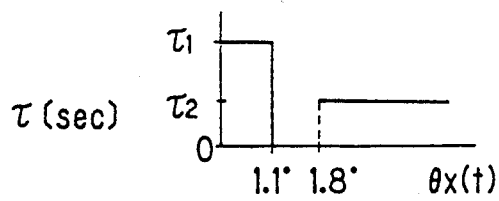
FIGS. 3A and 3B are graphic views illustrating the characteristics of the updating time used for calculation of the knock learn value and a specific value for a renewal.
Figure 3B:
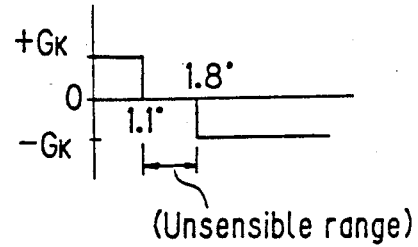

This knock learn value $K_{KNI}$ is sequentially acquired by executing a knock learn value calculating routine (not shown) every time the engine operation range enters a predetermined learn range (see FIG. 2). This knock learn value calculating process is so designed as to repeat the process that, for example, when a knock retard control amount $\theta x(t)$ is in dead zone from 1.1 to 1.8 as shown in FIG. 3, the knock learn value $K_{KNI}$ is used without changing it, when $\theta x(t)$ is in the range over 1.8 for a time $\tau_2$ or more, the knock learn value $K_{KNI}$ is decreased by a negative specific value $G_{K'}$ and when $\theta x(t)$ remains in the range below 1.1 for a time $\tau_1$ or more, the knock learn value $K_{KNI}$ is increased by a positive specific value $+G_K$.

In step b6 it is discriminated whether or not the present knock learn value $K_{KNI}(t)$ is greater than the maximum allowable knock learn value $K_{MAX}$; if the former value is greater than the latter, the flow advances to step b7, and if the former value is equal to or less than the latter, the flow goes to step b9.

In step b7, as it is considered that the knock learn value is in the frequent knocking region, the blend ratio is decreased to suppress the knocking. More specifically, a blend ratio compensation gain $\Delta B_-$ is subtracted from the previous control blend ratio B(t−1). Then, the flow goes to step b8 where the knock learn value $K_{KNI}$ is considered as being reflected on the blend ratio and the knock learn value $K_{KNI}(t)$ is cleared before moving to step b3.

In step b9 it is discriminated whether or not the present knock learn value $K_{KNI}(t)$ is less than the minimum allowable knock learn value $K_{MIN}$. If the former value is less than the latter, the flow advances to step b10, and if the former value is equal to or greater than the latter, the flow moves to step b11.

In step b11, as the present knock learn value $K_{KNI}(t)$ is in the unsensible range, the previous control blend ratio B(t−1) is taken as the present blend ratio B(t), and the flow moves to step b3.

If the flow moves from step b9 to step b10 because of the knock learn value being in the unknocking region, the blend ratio is increased to shift to the knock generating side. More specifically, a blend ratio compensation gain $\Delta B_+$ is added to the previous control blend ratio B(t−1). Then, the flow advances to step b8 where, with the knock learn value $K_{KNI}$ considered as being reflected on the blend ratio, the knock learn value $K_{KNI}(t)$ is cleared before moving to step b3.

When the blend ratio calculating routine is terminated and the flow returns to step a3 of the main routine, the engine revolution speed $N_E$ is obtained and it is discriminated whether or not $N_E$ is greater than the engine operation discrimination revolution speed $N_{ESTOP}$.

When the flow reaches step a4 while the engine is rotating, the control blend ratio B(t) and various compensation coefficients are obtained as needed, the fuel injection amount control process, ignition timing control process and other controls are executed as needed. Then, the flow advances to step a5.

In calculating, for example, the fuel injection amount or fuel injection valve drive time $T_{IMJ}$, first the basic drive time $T_B (=A/N(n) \times K_S)$ per sucked air flow rate is computed. The blend ratio compensation coefficient $K_S$ is used to convert the basic drive time $T_B$ (basic fuel amount) per a predetermined sucked air flow rate $A/N(n)$, set in advance for 100%-gasoline fuel or 0%-methanol fuel, as an equivalent amount of the blend ratio measured by the blend ratio sensor and computed thereafter. Further, the fuel injection valve drive time $T_{IMJ}$ is calculated using individual compensation values, such as the basic drive time $T_B$, feedback compensation coefficient $K_{FB}$, air temperature compensation coefficient $Kt$, air pressure compensation coefficient $Kb$, water temperature compensation coefficient $Kwt$ and acceleration compensation coefficient $Kac$: $T_{INJ} = T_B \times K_{FB} \times Kt \times Kb \times Kwt \times Kac$.

When the flow reaches step a5, it is discriminated whether or not a key-off event has taken place. When it is not the key-off, the flow returns to step a2. When the key-off event has taken place, however, a main process at the key-off time, such as data storage in a non-volatile memory, is performed, and the main routine is terminated.

When the flow goes from step a3 to step a7 as the engine is stopped, the controller waits for the starter switch being set on. If the switch is OFF, the flow advances to step a8 where a predetermined process associated with the engine stop is executed. When the starter switch is rendered ON, the flow moves to step a9 where various processes associated with the engine start are performed before moving to step a5.

Second Embodiment

Figure 7:
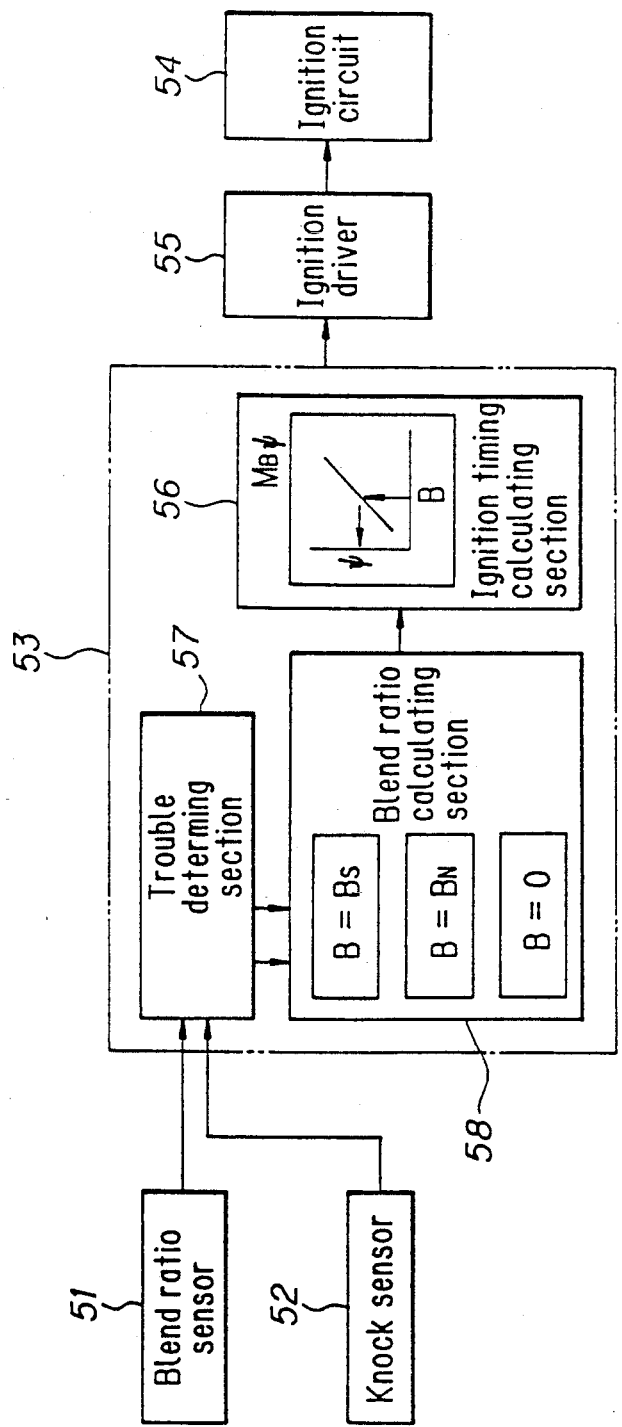
FIGS. 7 to 10 are diagrams for the second embodiment of the present invention.

As shown in FIG. 7, this embodiment uses a blend ratio sensor 51 to output the blend ratio $B_S$ of the fuel mixture of gasoline and methanol, a knock sensor 52 to output knock data $N_S$ of an internal combustion engine, control means for acquiring ignition timing $\psi$ according to the control blend ratio B, obtained from the blend ratio $B_S$ and the knock data $N_S$, and outputting it, and a ignition driver 55 for driving an ignition circuit 54 in accordance with the ignition timing $\psi$ from the control means 53.

The control means 53 has functions of a trouble determining section 57 and a blend ratio calculating section 58 as well as a function of an ignition timing calculating section 56.

The trouble determining section 57 determines a failure based on the outputs of the blend ratio sensor 51 and knock sensor 52 when these values are abnormal. When the blend ratio sensor fails, the determining section 57 applies a blend ratio sensor failure signal a to the blend ratio sensor 51. When both the blend ratio sensor 51 and knock sensor 52 fail, the section 57 outputs a both sensor failure signal b.

When failure signals a and b are not received, the blend ratio calculating section 58 takes the blend ratio $B_S$ from the blend ratio sensor 51 as the control blend ratio B. Upon reception of the failure signal a which indicates that the blend ratio $B_S$ is not obtained from the sensor 51, the section 58 takes the blend ratio $B_N$ acquired from the knock data $N_S$ as the control blend ratio B. Upon reception of the failure signal b indicating that both blend ratios cannot be obtained, the section 58 outputs the control blend ratio B as a preset fixed value, for example, 0% methanol.

The ignition timing calculating section 56 acquires the ignition timing $\psi$ according to the engine speed data and engine load data for each blend ratio from the ignition timing calculation map, and outputs the obtained ignition timing $\psi$ to the ignition driver 55.

The ignition driver 55 counts the received ignition timing $\psi$ based on a reference crank angle signal and a unit crank angle, and outputs an ON/OFF signal to an ignition switch transistor in the ignition circuit 54 every time the ignition timing is reached.

According to the present method employing the above-described means, the blend ratio $B_S$ from the blend ratio sensor 51 is taken as the control blend ratio B at the normal time, the blend ratio $B_N$ acquired from the knock data $N_S$ as the ratio B when the failure signal a is input, and the fixed value of 0% as the ratio B when the failure signals a and b are received. Based on the control blend ratio B, the ignition timing $\psi$ is calculated and the ignition driver 55 activates the ignition circuit 54 at the ignition timing $\psi$. Accordingly, the proper ignition timing $\psi$ is acquired based on the blend ratio obtained according to the outputs of the blend ratio sensor 51 and knock sensor 52 at the normal time, and the ignition process is executed at the ignition timing which does not adversely affect the engine even when both sensors 51 and 52 fail.

It is to be noted that the engine control of the FFV used in this embodiment has the same structure as the one shown in FIG. 4.

Figure 8:
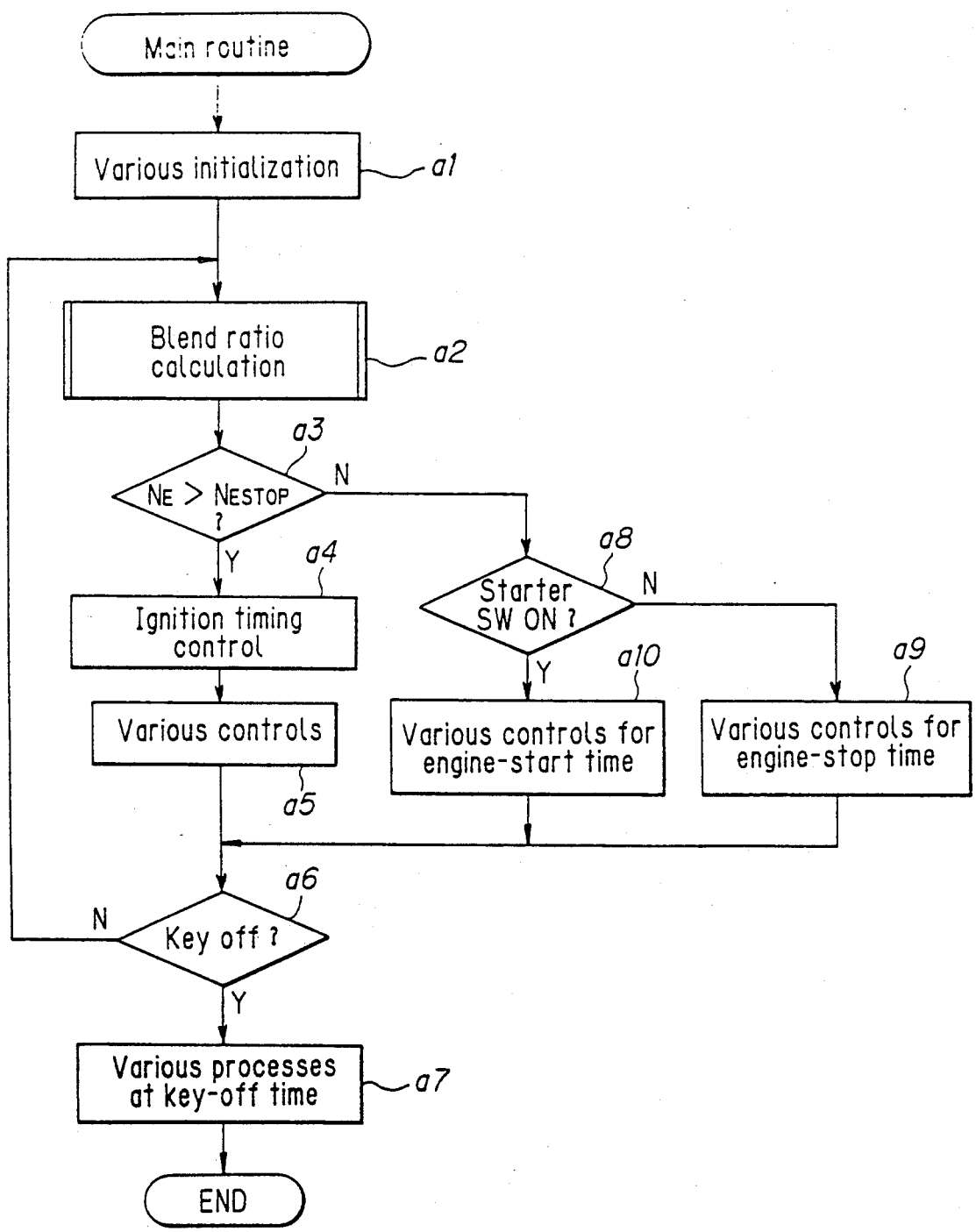
Figure 9:
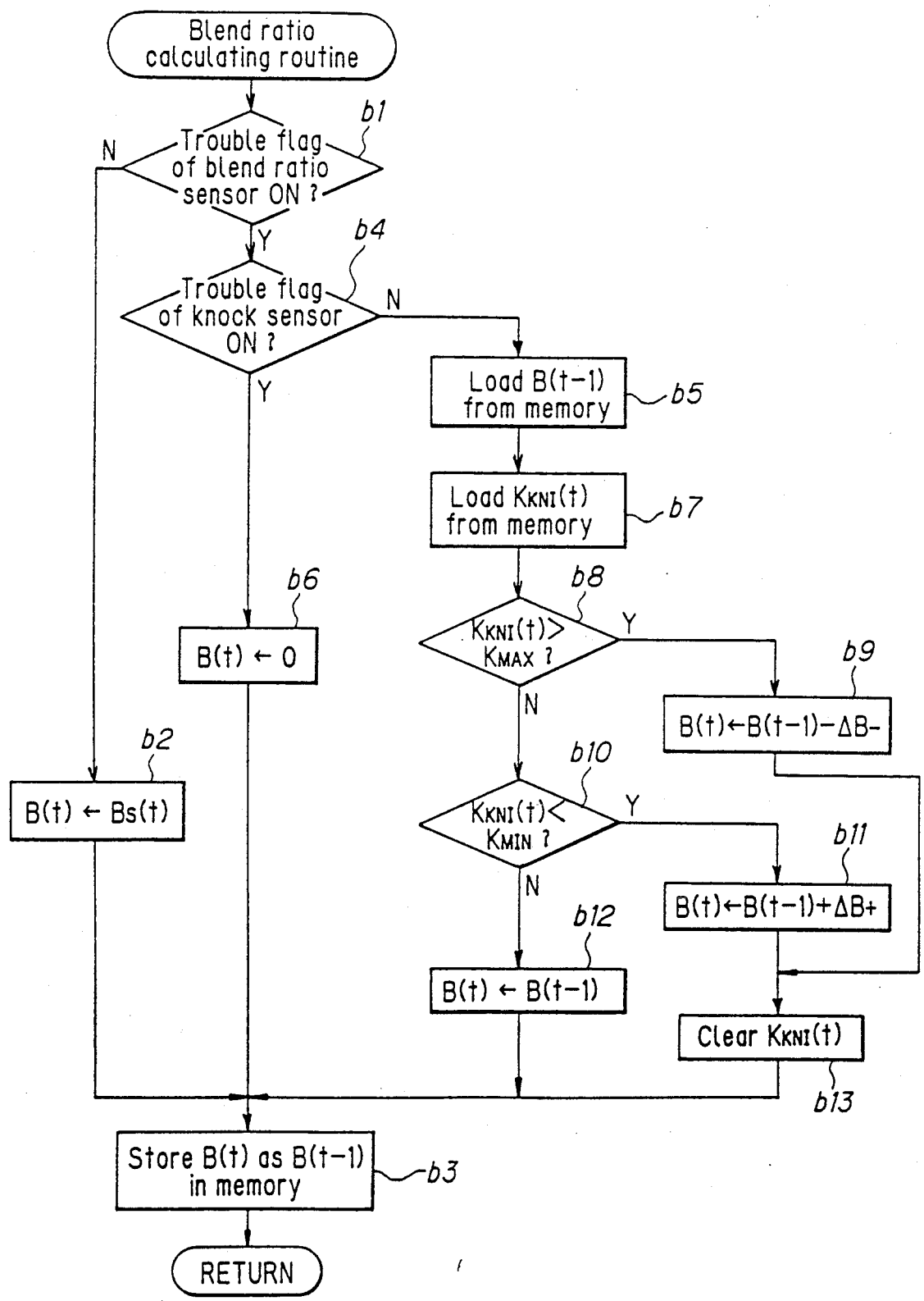
Figure 10:
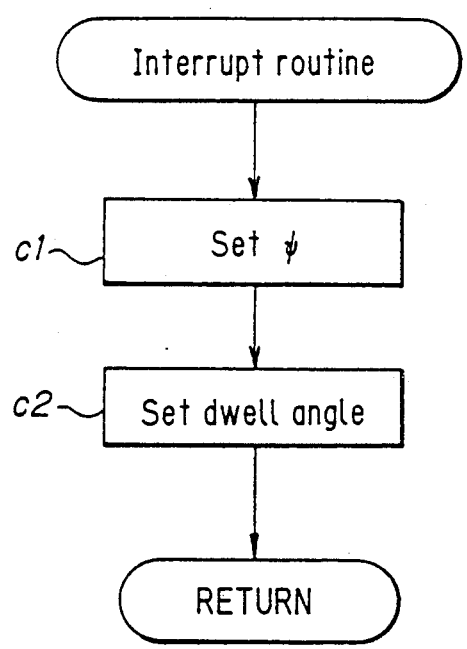

Then, the operation of the controller 25 will be explained referring to the control programs shown in FIGS. 8 to 10.

To begin with, the flowchart of a computer to which the present method is applied will be explained referring to FIG. 8.

This computer obtains the ignition timing $\psi$ in the main routine, acquires the control blend ratio B for use in calculating the ignition timing $\psi$ in the blend ratio calculating routine, and sets the latest ignition timing $\psi$ to the ignition driver 55 in the interrupt routine.

Turning on a key switch (not shown) of the engine drives the controller and the individual sensors. First, the controller 25 sets initial values to individual set values, measuring values, etc., and enters a blend ratio calculating routine in step a2 (FIG. 9).

In the blend ratio calculating routine, it is discriminated in step b1 whether or not the trouble flag of the blend ratio sensor 43 is ON. If the flag is OFF, the flow advances to step b2 where the present blend ratio $B_{FCS}$ as a control blend ratio B(t). This control blend ratio B(t) is stored as the previous control blend ratio B(t−1) in a memory in step b3, then the flow returns to the main routine.

When the blend ratio sensor 43 is discriminated as damaged in step b1, the flow advances to step b4 where it is discriminated whether or not the knock sensor 52 is failing. If the knock sensor 52 is not failing, the flow advances to step b5, and if the sensor 52 is failing, the flow moves to step b6.

In steps b5 and b8, the previous control blend ratio B(t−1) is loaded from a memory and the knock learn value $K_{KNI}(t)$ is loaded from the memory.

This knock learn value $K_{KNI}$ is sequentially acquired by executing a knock learn value calculating routine (not shown) every time the engine operation range enters a predetermined learn range (see FIG. 2). This knock learn value calculating process is so designed as to repeat the process that, for example, when a knock retard control amount $\theta x(t)$ is in the unsensible range from 1.1 to 1.8 as shown in FIG. 3, the knock learn value $K_{KNI}$ is used without changing it, when $\theta x(t)$ is in the range over 1.8 for a time $\tau_2$ or more, the knock learn value $K_{KNI}$ is decreased by a specific value $G_K$ and when $\theta x(t)$ remains in the range below 1.1 for a time $\tau_1$ or more, the knock learn value $K_{KNI}$ is increased by a specific value $+G_K$.

In step b8 it is discriminated whether or not the present knock learn value $K_{KNI}(t)$ is greater than the maximum allowable knock learn value $K_{MAX}$; if the former value is greater than the latter, the flow advances to step b9, and if the former value is equal to or less than the latter, the flow goes to step b10.

In step b9, as it is considered that the knock learn value is in the frequent knocking region, the blend ratio is decreased to suppress the knocking. More specifically, a blend ratio compensation gain $\Delta B_-$ is subtracted from the previous control blend ratio B(t--1) Then, the flow goes to step b8 where the knock learn value $K_{KNI}$ is considered as being reflected on the blend ratio and the knock learn value $K_{KNI}(t)$ is cleared before moving to step b3.

In step b10 it is discriminated whether or not the present knock learn value $K_{KNI}(t)$ is less than the minimum allowable knock learn value $K_{MIN}$. If the former value is less than the latter, the flow advances to step b11, and if the former value is equal to or greater than the latter, the flow moves to step b12.

In step b12, as the present knock learn value $K_{KNI}(t)$ is in the unsensible range, the previous control blend ratio B(t−1) is taken as the present blend ratio B(t), and the flow moves to step b3.

If the flow moves from step b10 to step b11 because of the knock learn value being in the unknocking region, the blend ratio is increased to shift to the knock generating side. More specifically, a blend ratio compensation gain $\Delta B$ is added to the previous control blend ratio B(t−1). Then, the flow advances to step b13 where, with the knock learn value $K_{KNI}$ considered as being reflected on the blend ratio, the knock learn value $K_{KNI}(t)$ is cleared before moving to step b3.

When the flow moves to step b6 from step b5 as the knock sensor 2 is failing, the preset fixed value or 0% methanol is set as the control blend ratio B, then the flow advances to step b3.

When the blend ratio calculating routine is terminated and the flow returns to step a3 of the main routine, the engine revolution speed $N_E$ is obtained and it is discriminated whether or not $N_E$ is greater than the engine operation discrimination revolution speed $N_{ESTOP}$.

When the flow reaches step a4 while the engine is rotating, the ignition timing control process will be executed.

In this process, the engine revolution speed and engine load data are obtained, and an ignition timing calculation map $M_S\psi$ according to the control blend ratio B is selected. Based on the map $M_S\psi$, the ignition timing $\psi$ is acquired from the present engine revolution speed and engine load data, and the value of a predetermined area is updated.

The interrupt routine is executed every time a predetermined crank angle is reached during execution of this main routine. In the interrupt routine, the latest ignition timing $\psi$ and dwell angle are loaded as shown in FIG. 10 and set in the ignition driver 44.

Through this process, the ignition driver counts the unit crank angle thereafter and performs the ignition operation.

After the ignition timing control process, various compensation coefficients, such as the control blend ratio B(t), are obtained as needed, the fuel injection amount control process, and other controls, such as calculation of the knock learn value $K_{KNI}$, will be executed as needed. Then, the flow advances to step a5. In calculating, for example, the fuel injection amount or fuel injection valve drive time $T_{IMJ}$, first the basic drive time $T_B (=A/N(n) \times K_S)$ per sucked air flow rate is computed. The blend ratio compensation coefficient $K_S$ is used to convert the basic drive time $T_B$ (basic fuel amount) per a predetermined sucked air flow rate A/N(n), set in advance for 100%-gasoline fuel or 0%-methanol fuel, as an equivalent amount of the blend ratio measured by the blend ratio sensor and computed after that. Further, the fuel injection valve drive time $T_{IMJ}$ is calculated using individual compensation values, such as the basic drive time $T_B$, feedback compensation coefficient $K_{FB}$, air temperature compensation coefficient Kt, air pressure compensation coefficient Kb, water temperature compensation coefficient Kwt and acceleration compensation coefficient Kac:
$T_{IMJ} = T_B \times K_{FB} \times Kt \times Kb \times Kwt \times Kac.$ When the flow reaches step a6, it is discriminated whether or not a key-off event has taken place. When it is not the key-off, the flow returns to step a2. When the key-off event has taken place, however, a main process at the key-off time, such as data storage in a non-volatile memory, is performed, and the main routine is terminated.

When the flow goes from step a3 to step a8 as the engine is stopped, the controller waits for the starter switch being set on. If the switch is OFF, the flow advances to step a9 where a predetermined process associated with the engine stop is executed. When the starter switch is rendered ON, the flow moves to step a10 where various processes associated with the engine start are performed before moving to step a6.

In the above process, the control blend ratio B is obtained from the knock learn value $K_{KNI}$ when the blend ratio sensor 51 fails. Instead, the control blend ratio B may be increased by a predetermined value $\Delta B$ when the knock data exceeds a set value. Alternatively, the middle value (e.g., blend ratio of 45%) may simply be selected.

What is claimed is:

1. An engine control system comprising:
   a blend ratio sensor, arranged in a fuel supply pipe to supply fuel to an engine, for detecting a blend ratio of methanol;
   a knock sensor for outputting knock information of said engine;
   a calculating means for computing fuel blended ratio based on said knock information;
   compensation means for compensating a signal from said blend ratio sensor with an output signal from said calculating means, and for acquiring a control blend ratio;
   trouble detecting means for detecting failure of said blend ratio sensor;
   memory means for memorizing a blend ratio right before failure of said blended ratio sensor, as an assumed blend ratio when said blend ratio sensor fails; and
   control means for controlling said engine in accordance with said assumed blend ratio and a signal from said compensation means.

2. An engine control system according to claim 1, wherein said control means controls the ignition timing of said engine.

3. An engine control system according to claim 1, wherein when a knock learn value is equal to or greater than a predetermined value in a case of said blend ratio sensor failing, said assumed blend ratio is reduced, and when said knock learn value is smaller than said predetermined value, said assumed blend ratio is increased, and output as said control blend ratio.

4. An engine control system according to claim 1, wherein said control means controls the ignition timing by setting said control blend ratio to zero when said blend ratio and knock data are not available.

5. An engine control system according to claim 1, wherein when an output of said knock sensor is discriminated as improper, said control blend ratio is set to zero to thereby control said ignition timing.

6. An engine control system according to claim 2, further comprising:
   a first optimal ignition timing map in which an optimal ignition timing based on a maximum value of a blend ratio of fuel containing methanol is memorized in accordance with an engine revolution speed and an engine load;
   a second optimal ignition timing map in which a optimal ignition timing based on a minimum value of said blend ratio of fuel containing said methanol is memorized in accordance with said engine revolution speed and said engine load; and
   an interpolation value map having interpolation values set therein in accordance with said blend ratio of fuel containing said methanol, and
   further comprising a step of interpolating an ignition timing according to said engine revolution speed and said engine load, with an interpolation value to thereby acquire a target ignition timing.

7. An engine control system according to claim 6, wherein said target ignition timing is calculated from $$D = D_0 = K'(D_{100} - D_0)$$

where
- D is said target ignition timing,
- $D_{100}$ is said optimal ignition timing when said methanol blend ratio is 100%,
- $D_0$ is said optimal ignition timing when said methanol blend ratio is 0%, and
- $K'$ is an interpolation coefficient ($1 \geq K' \geq 0$).

8. An engine control system according to claim 6, wherein said target ignition timing is calculated from $$D = D_0 + (K/100)(D_{100} - D_0)$$

where
- D is said target ignition timing,
- $D_{100}$ is said optimal ignition timing when said methanol blend ratio is 100%,
- $D_0$ is said optimal ignition timing when said methanol blend ratio is 0%, and
- K is an interpolation coefficient ($1 \geq K' \geq 0$).

9. An engine control system according to claim 8, wherein said interpolation values are stored at intervals of 10% from said blend ratios of 0 to 100%.

* * * * *